United States Patent [19]
Morioka et al.

[11] Patent Number: 5,400,073
[45] Date of Patent: Mar. 21, 1995

[54] VIDEO CAMERA

[75] Inventors: Masanobu Morioka, Tokyo; Tatsuya Tsutsui, Kanagawa, both of Japan

[73] Assignee: Sony Corporation, Japan

[21] Appl. No.: 106,715

[22] Filed: Aug. 16, 1993

[30] Foreign Application Priority Data

Aug. 27, 1992 [JP] Japan .................. 4-227684

[51] Int. Cl.6 ............................. H04N 5/225
[52] U.S. Cl. ....................... 348/335; 348/375
[58] Field of Search ............ 348/340, 373, 374, 375, 348/65, 335; H04N 5/225

[56] References Cited

U.S. PATENT DOCUMENTS

5,032,919  7/1991  Randmae ..................... 348/374

Primary Examiner—Michael T. Razavi
Assistant Examiner—Michael H. Day
Attorney, Agent, or Firm—Ronald P. Kananen

[57] ABSTRACT

A video camera includes a flangeback adjusting mechanism including a front panel having a threaded opening through which an optical lens is mounted from an outer side of the camera. An adjusting ring is engaged at the inner side of the threaded opening and is movable in an axial direction according to rotation thereof. On either side of the adjusting ring, guide rods project from an inner face of the front panel, mounting thereon a holder which supports an image pickup device. Nuts are affixed to the ends of the guide rods and coil springs are fitted around the guide rods between the nuts and a rear face of the holder so as to bias the holder in the forward direction.

19 Claims, 7 Drawing Sheets

VIDEO CAMERA

BACKGROUND OF THE INVENTION

1. Field of The Invention

The present invention relates generally to a video camera. Particularly, the invention relates to a video camera which is lightweight and compact.

2. Description of The Prior Art

Video cameras are widely used in industry and by various people privately and professionally. In order to increase the variety of uses for such video cameras and for increasing the portability and convenience thereof, it has been required for various reasons to provide a video camera which is light in weight and small in size and which uses a reduced number of parts.

Figure 5:
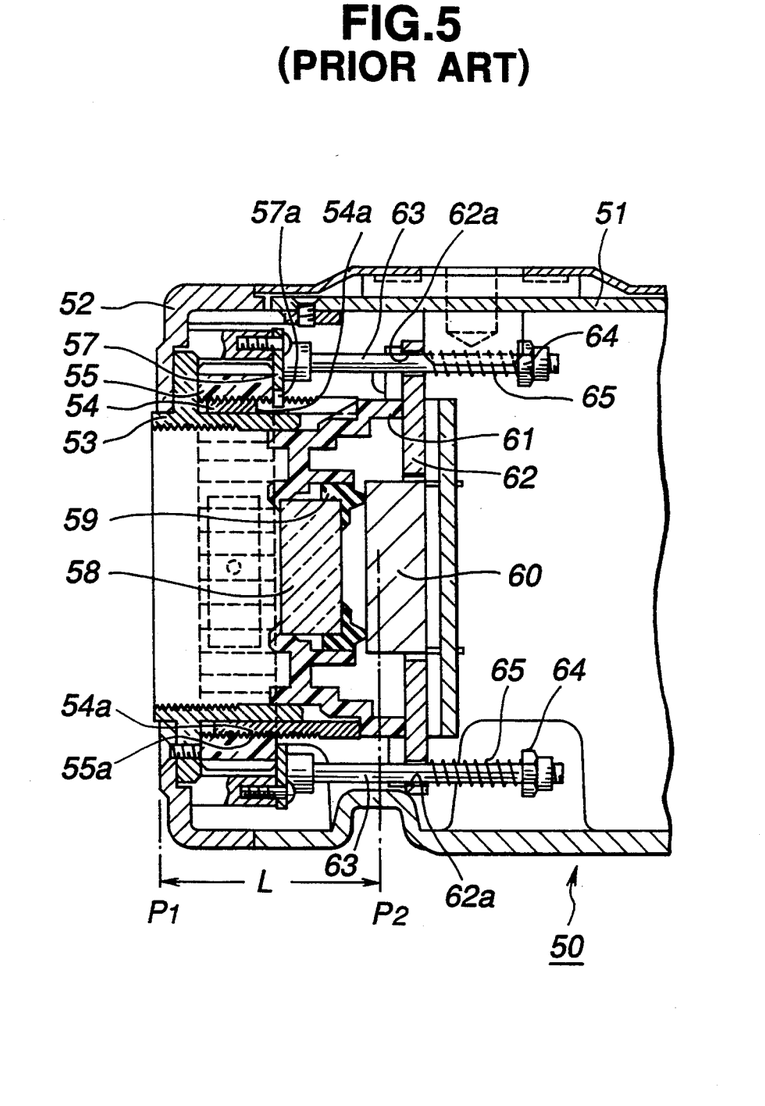
FIG. 5 is a cross-sectional view of a front side of a conventional video camera.
Figure 6:
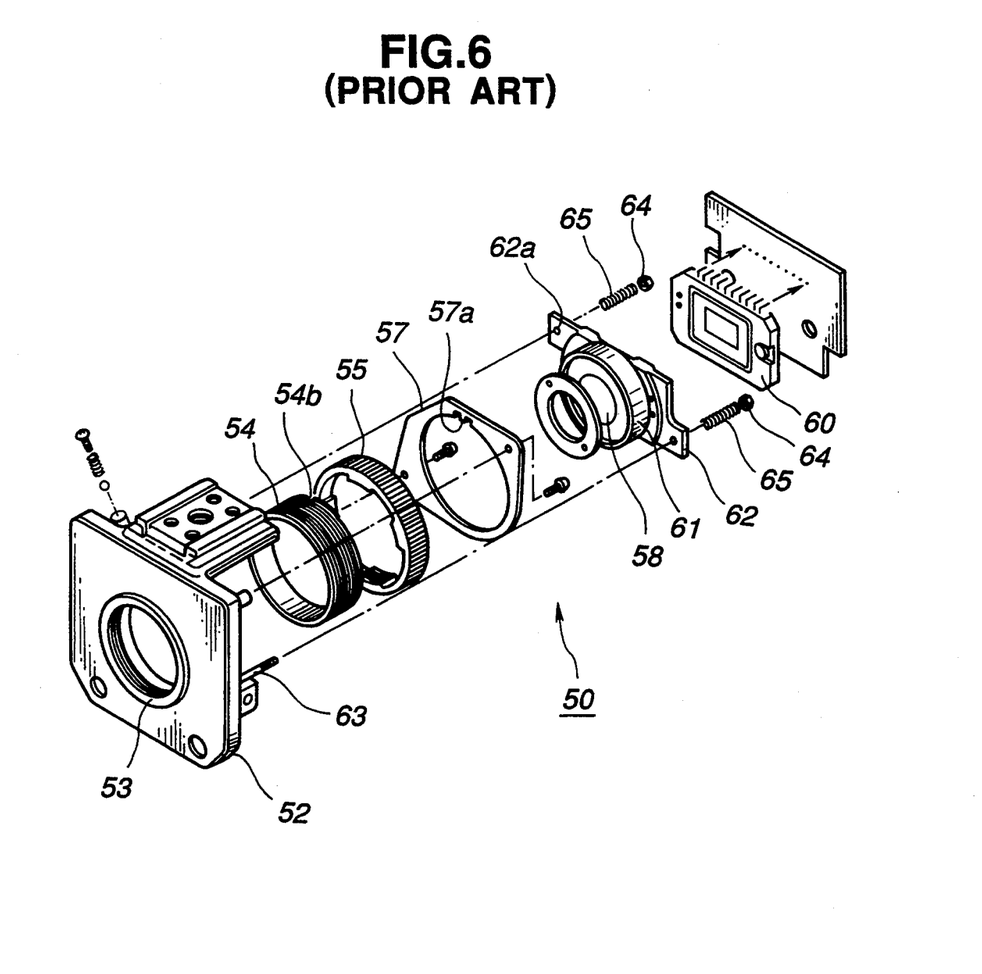
FIG. 6 is an exploded perspective view of the front side of the conventional video camera of FIG. 5.

FIG. 5 shows a cross sectional view of a front side of a conventional video camera, while FIG. 6 shows an exploded perspective view thereof. As may be seen from FIGS. 5 and 6, a video camera 50 includes a box-shaped casing 51 and a front panel 52. In a center portion of the front panel 52 a lens mounting opening 53 is formed. A movement enabling ring 54 fits around an outer circumference of the lens mounting opening 53 while an adjusting ring 55 fits around an outer circumference of the movement enabling ring 54, as best seen in FIG. 5. At an outer circumference of the movement enabling ring 54 and an inner circumference of the adjusting ring 55, threaded portions 54a and 55a are respectively formed for allowing the movement enabling ring 54 and the adjusting ring 55 to rotatably engage in screw-like fashion. Further, in the axial direction of the movement enabling ring 54 a longitudinal groove 54b is formed. The longitudinal groove 54b receives a projecting portion 57a of a push plate 57, as seen in FIG. 6. The adjusting ring 55 is movable in the axial direction thereof according to movement of the push plate 57.

Also, as seen in the drawings, according to such conventional video camera construction an optical filter 58 is provided. Referring to FIG. 5, a mediating member 59 is disposed around the optical filter 58 for spacing the optical filter 58 from an image pickup device 60, such as a CCD or the like. The optical filter 58, the mediating member 59 and the image pickup device 60 are retained in an installation member 61 which is attached to a metal plate 62. The metal plate 62 is provided with two cylindrical openings 62a, 62a which respectively receive guide rods 63, 63 therethrough. Forward ends of the guide rods 63, 63 are anchored in the rear face of the front panel 52. The rearward ends of the guide rods 63, 63 are secured by nuts 64, 64 at the rear side of the metal plate 62 and coil springs 65, 65 are interposed between the rear side of the metal plate 62 and the nuts 64, 64, one of the coil springs 65 being disposed around one of the guide rods 63 respectively. Thus, due to the spring force of the coil springs 65, 65 the metal plate 62, the installation member 61, the push plate 57 and the adjusting ring 55 are collectively biased in the axially forward direction toward the movement enabling ring 54 to place pressure thereon.

According to this construction, the rotatable adjusting ring 55 is engaged with the movement enabling ring 54 via the threaded portions 55a and 54a. The adjusting ring 55 is movable in the axial direction according to rotation thereof along the movement enabling ring 54 to limits determined by the pitch of the threaded portions 55a and 55b. According to the movement of the adjusting ring 55, the compression force of the coil springs 65 received by the installation member 61 is active to change the axial position thereof for moving the image pickup device 60. According to this, a 'flangeback' distance L may be adjusted between a standard lens mounting position P1 and a position P2 of the image pickup device 60.

According to such conventional construction, a mechanism for effecting flangeback adjustment becomes complex. A number of parts required is high and assembly and parts costs are increased. In addition reliability is more difficult to assure for such a complex mechanism. Also, since a certain distance (L) is required between the image pickup device 60 and the front panel due to the number of structural components, a CS mount design, which may accommodate the mechanism and shorten the distance L, is difficult to implement and an overall size of the video camera tends to be increased.

Thus it has been required to provide a lightweight, compact video camera with simplified mechanical structure.

SUMMARY OF THE INVENTION

It is therefore a principal object of the present invention to overcome the drawbacks of the prior art.

It is a further object of the present invention to provide a video camera which is both compact and lightweight and which may operate with a simplified mechanism.

In order to accomplish the aforementioned and other objects, a video camera is provided, comprising: a front panel having a threaded opening for receiving a lens screwed from a front side thereinto, a holder for holding an image pickup device, a connecting means for movably connecting the holder to the front panel along an optical axis of the lens, a slider arranged between the front panel and the holder, the slider having a screw engaged with the threaded opening and a contact plane contacting with the holder so that a distance between the lens and the image pickup device can be adjusted by screwing the slider into or out of the threaded opening.

According to another aspect of the present invention a video camera is provided, comprising: a front panel having a threaded opening for screwing a portion of a lens thereinto from a front side, a holder for holding an image pickup device, a connecting means for movably connecting the holder to the front panel along an optical axis of the lens, a slider being arranged between the front panel and the holder, and having a screw for being engaged with the threaded opening and a contact plane for contacting with the holder so that a distance between the lens and the image pickup device can be adjusted by screwing the slider into or out of the threaded opening, a body in which the front panel, the holder, the connecting means and the slider are provided.

DESCRIPTION OF THE PREFERRED EMBODIMENT

Figure 8:
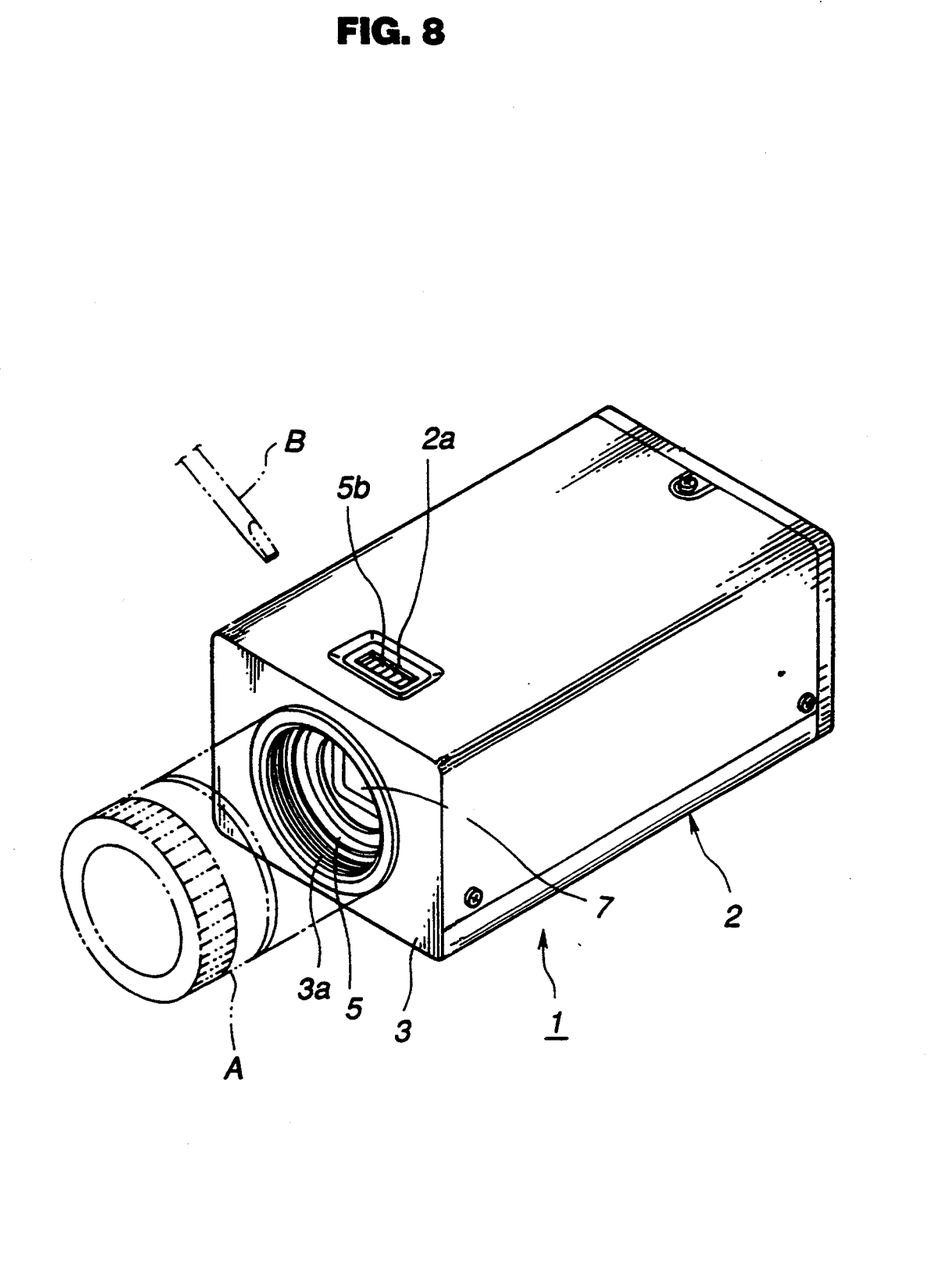
FIG. 8 is a perspective view of a fully assembled video camera having an integral body and front panel.

Referring now to FIGS. 1 to 4, a video camera 1 according to the invention comprises a casing 2 substantially enclosing the camera mechanism. A front panel 3 is provided at a front side of the casing 2. According to the present embodiment, the front panel 3 is formed separately from the casing 2 but may alternatively, be formed integrally therewith (as shown, for example, in FIG. 8). The front panel 3 includes a threaded opening 3a therethrough at a substantially center portion thereof. The threaded opening 3a receives an optical lens A, mounted from an outer side of the front panel in screw on fashion, for example. Further, at diagonally opposite corner portions of the front panel 3, guide rods 4, 4 are projected in the axial direction of the lens A. The guide rods 4, 4 are fixed at one end to the front panel 3, and the other ends 4a, 4a thereof are threaded. An adjusting ring 5 is provided at an inner side of the threaded opening 3a of the front panel 3. The adjusting ring 5 has a two-step circular construction having a smaller diameter forward portion with a threaded outer circumference 5a and a larger diameter rear portion which may have a toothed or knurled outer circumference 5b. It will be noted that the outer circumference of the adjusting ring 5 is determined to be smaller than the distance between the diagonally spaced guide rods 4, 4 and the diameter of the inner circumference of the adjusting ring 5 is greater than the longest dimension of the image pickup device 7.

Figure 4:
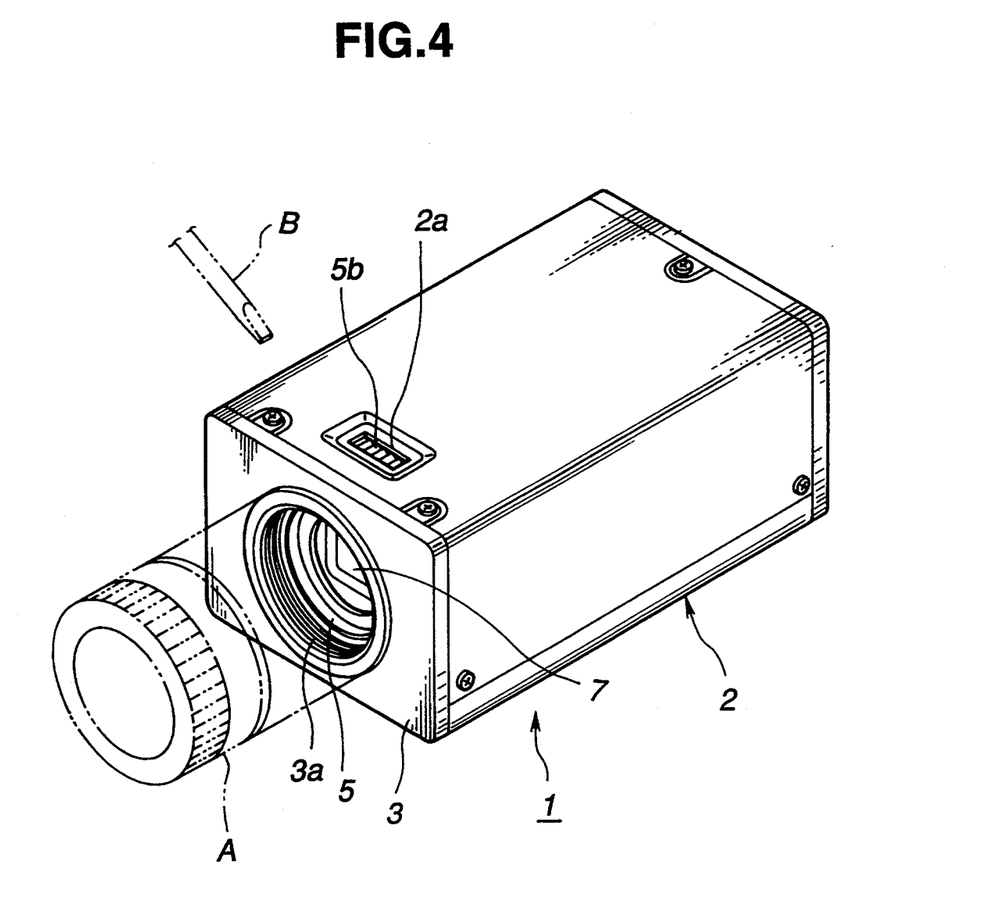
FIG. 4 is a perspective view of a fully assembled video camera according to the invention.

As seen in FIG. 4, the casing 2 is provided with an opening 2a positioned such that, when the threaded forward portion 5a of the adjusting ring 5 is engaged with the threaded opening 3a of the front panel, a portion of the outer circumference 5b is accessible via the opening 2a. Thus, adjustment of the distance L may be effected by moving the adjusting ring from the outside via a tool such as a screwdriver B, as shown in FIG. 4, or by hand.

Figure 1:
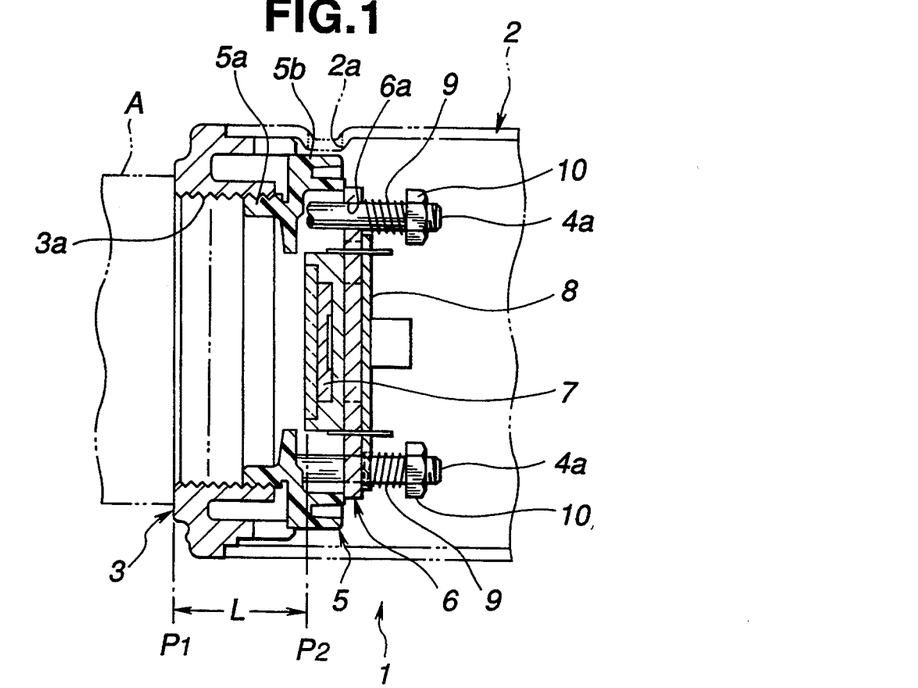
FIG. 1 is a cross-sectional view of a front side of a preferred embodiment of a video camera according to the invention.
Figure 2:
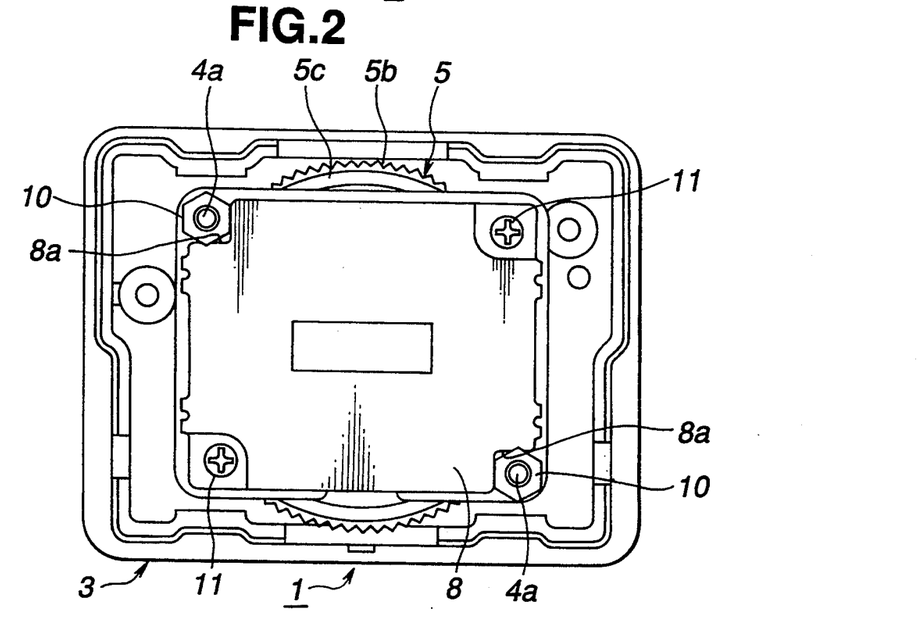
FIG. 2 is a rear view of the front side of the video camera according to the preferred embodiment.
Figure 3:
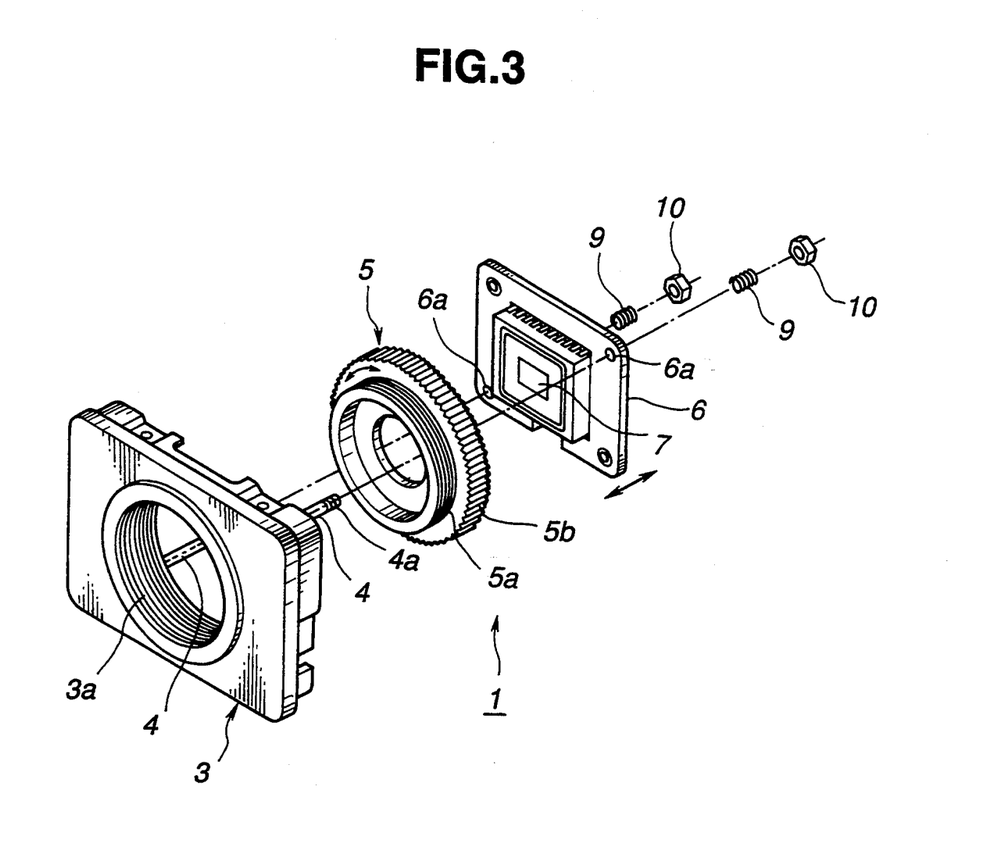
FIG. 3 is an exploded perspective view of the video camera of the preferred embodiment.

The threaded ends 4a, 4a of the guide rods 4, 4 are inserted through holes 6a, 6a provided in a holder 6. The threaded ends 4a, 4a are engaged by nuts 10, 10 and coil springs 9, 9 are interposed between the nuts 10, 10 and a rear face of the holder 6. The image pickup device 7 is mounted on the holder 6 at a substantially center portion thereof, facing in the direction of the threaded opening 3a of the front panel 3. The image pickup device according to the present embodiment is a charge coupled device (CCD) or the like. In addition, on the rear face of the holder 6, a substrate 8 is mounted. The corners of the substrate 8 corresponding to the positions of the guide rods 4 have cut-out portions 8a, 8a formed therein, as may be seen in FIG. 2, such that the coil springs 9 apply pressure to the rear face of the holder 6. According to this construction the image pickup device is stably held in up, down, upside down, or any other operating position.

The above-described embodiment may be operated by turning the adjusting ring 5 via a tool such as a screw driver, as previously mentioned. When the adjusting ring is turned in the clockwise direction, for example, the rear face 5c of the adjusting ring is moved in in a forward direction according to rotation of the threaded forward portion 5a engaged with the threaded opening 3a of the front panel. According to this movement, the coil springs 9, 9 push the holder 6 mounting the image pickup device 7 in the forward direction. Thus, the distance L between the lens position P1 and the image pickup position P2 may be modified for carrying out appropriate 'flangeback' adjustment. Also, when, for example, the adjusting ring 5 is rotated counterclockwise, the rear face 5c of the adjusting ring is moved rearward, compressing the coil springs 9, 9 and moving the image pickup device in the rearward direction.

Further, since the adjusting ring 5 is engaged in the same threaded opening as used for mounting an optical lens A from the outer side of the casing 2, the number of parts is reduced and an overall length of the mechanism is shortened. Also, the above construction allows an overall size of the video camera as well as the weight thereof to be reduced at once, as well as lowering manufacturing costs therefor. Since separate parts do not need to be provided for mounting the adjusting ring 5 a CS mount may be realized and no additional space need be provided in the flangeback adjusting mechanism.

Figure 7:
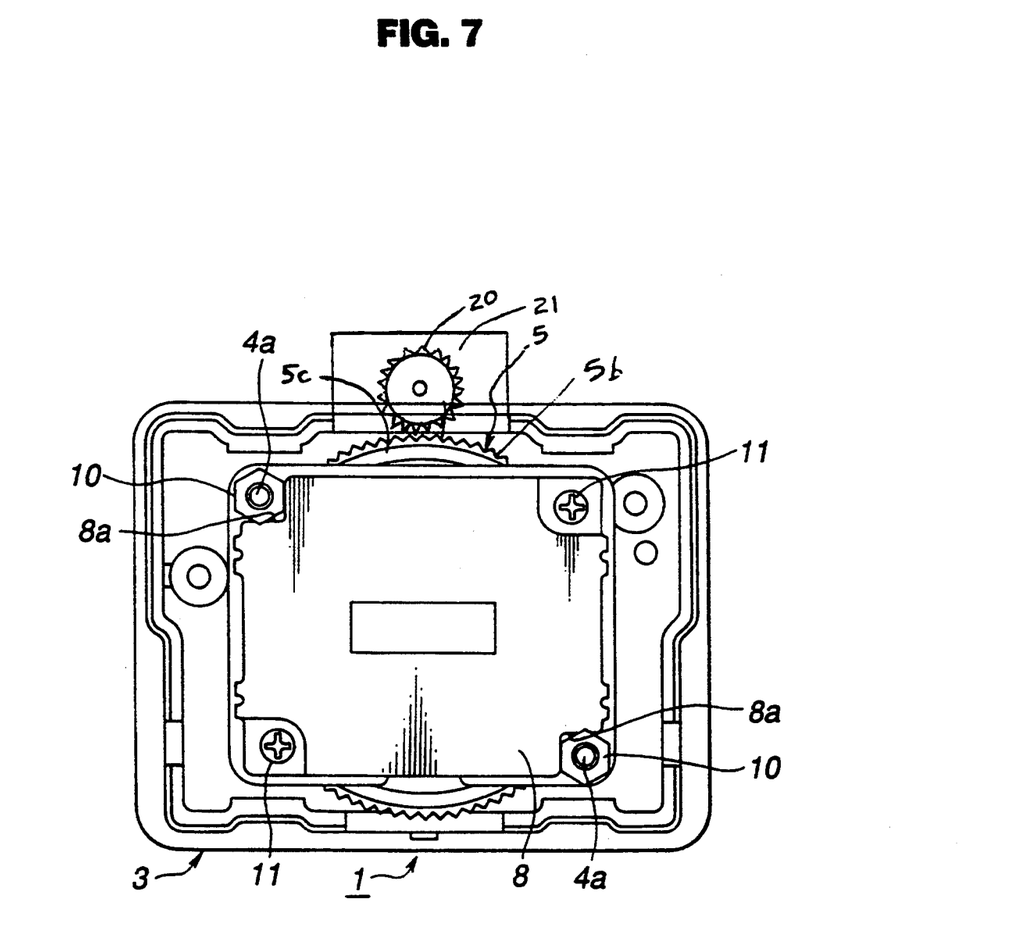
FIG. 7 is a rear view of the front side of the video camera with a motorized adjusting mechanism.

It will further be noted that, according to the above embodiment, the toothed outer circumference 5b of the adjusting ring 5 may be formed so as to engage with a gear 20 (FIG. 7) associated with a drive motor 21 or the like such that flangeback adjustment may be carried out via the motor so as to further simplify operation.

Though according to the present embodiment, two coil springs 9, 9 are used for biasing the holder 6, any number or type of resilient means may be used for such biasing operation.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of tile invention as set forth in the appended claims.

What is claimed is:

1. A video camera having a focusing mechanism, comprising:
    a front panel having a threaded opening for receiving a lens screwed from a front side thereinto;
    holding means for holding an image pickup device;
    connecting means movably connecting said holding means to said front panel along an optical axis of said lens, wherein said connecting means further comprises a plurality of guide rods being mounted on said front panel and biasing means biasing said connecting means in a direction parallel to the optical axis;
    slider means arranged between said front panel and said holder means, said slider means having a threaded portion engaged with said threaded opening and a contact plane contacting with said holding means so that a distance between said lens and said image pickup device can be adjusted by screwing said slider means into or out of said threaded opening, wherein said slider comprises a smaller diameter forward portion having said threaded portion in the form of a threaded outer circumference engaging with said threaded opening, and a larger circumference rearward portion, said contact surface being a rear face of said rearward portion.

2. A video camera as set forth in claim 1, wherein said biasing means comprises a coil spring disposed around each of said plurality of guide rods.

3. A video camera as set forth in claim 1, wherein two of said guide rods are provided spaced diagonally on said front panel.

4. A video camera as set forth in claim 1, wherein said slider means is formed of synthetic resin.

5. A video camera as set forth in claim 1, wherein said larger circumference rearward portion has a textured outer circumference.

6. A video camera as set forth in claim 1, wherein said larger circumference rearward portion has tooth portions formed on an outer circumference thereof.

7. A video camera as set forth in claim 6, further including a motor associated with a gear engaged with said tooth portions of said larger circumference rearward portion of said slider means, said slider means being rotatable according to operation of said motor.

8. A video camera as set forth in claim 1, wherein said image pickup device is a charge coupled device.

9. A video camera having a focusing mechanism, comprising:
a front panel having a threaded opening for screwing a portion of a lens thereinto from a front side;
holding means for holding an image pickup device;
connecting means for movably connecting said holding means to said front panel along an optical axis of said lens, wherein said connecting means further comprises a plurality of guide rods being mounted on said front panel and biasing means biasing said connecting means in a direction parallel to the optical axis;
slider means being arranged between said front panel and said holding means, and having a threaded portion for being engaged with said threaded opening and a contact plane for contacting with said holding means so that a distance between said lens and said image pickup device can be adjusted by screwing said slider means into or out of said threaded opening, wherein said slider comprises a smaller diameter forward portion having said threaded portion in the form of a threaded outer circumference engaging with said threaded opening, and a larger circumference rearward portion, said contact surface being a rear face of said rearward portion;
a body in which said front panel, said holding means, said connecting means and said slider are provided.

10. A video camera as set forth in claim 3, wherein said body and said front panel are integrally formed.

11. A video camera as set forth in claim 9, wherein said biasing means comprises a coil spring disposed around each of said plurality of guide rods.

12. A video camera as set forth in claim 11, wherein two of said guide rods are provided spaced diagonally on said front panel.

13. A video camera as set forth in claim 9, wherein said slider means is formed of synthetic resin.

14. A video camera as set forth in claim 9, wherein said larger circumference rearward portion has a textured outer circumference.

15. A video camera as set forth in claim 9, wherein said larger circumference rearward portion has tooth portions formed on an outer circumference thereof.

16. A video camera as set forth in claim 15, further including a motor associated with a gear engaged with said tooth portions of said larger circumference rearward portion of said slider means, said slider means being rotatable according to operation of said motor.

17. A video camera as set forth in claim 9, wherein said image pickup device is a charge coupled device.

18. A video camera, comprising:
a front panel having a threaded opening for screwing a portion of a lens thereinto from a front side;
holding means for holding a charge coupled image pickup device;
connecting means for movably connecting said holding means to said front panel along an optical axis of said lens wherein said connecting means further comprises a plurality of guide rods being mounted on said front panel and biasing means biasing said connecting means in a direction parallel to the optical axis;
slider means being arranged between said front panel and said holding means, and having a threaded portion for being engaged with said threaded opening and a contact plane for contacting with said holding means so that a distance between said lens and said image pickup device can be adjusted by screwing said slider means into or out of said threaded opening, wherein said slider comprises a smaller diameter forward portion having said threaded portion in the form of a threaded outer circumference engaging with said threaded opening, and a larger circumference rearward portion, said contact surface being a rear face of said rearward portion;
a body in which said front panel, said holding means, said connecting means and said slider are provided, wherein said body includes an opening through which said slider means is operable from outside of said body.

19. A video camera as set forth in claim 18, wherein an outer circumference of said slider means is accessible through said opening.

* * * * *